United States Patent [19]

Yamakoshi et al.

[11] Patent Number: 4,866,472

[45] Date of Patent: Sep. 12, 1989

[54] SHEET TRANSPORT APPARATUS

[75] Inventors: Yukiyoshi Yamakoshi; Hiroyuki Makiyama, both of Osaka, Japan

[73] Assignee: Minolta Camera Kabushiki Kaisha, Japan

[21] Appl. No.: 234,944

[22] Filed: Aug. 22, 1988

[30] Foreign Application Priority Data

Aug. 21, 1987 [JP] Japan ................................ 62-208760

[51] Int. Cl.⁴ .......................... G03B 27/32; B65H 5/22

[52] U.S. Cl. .......................................... 355/27; 271/3.1

[58] Field of Search ......................... 271/3.1, 218, 221; 355/27-29, 3 SH, 13, 14 SH

[56] References Cited

U.S. PATENT DOCUMENTS

| | | | |
|---|---|---|---|
| 3,709,595 | 1/1973 | Turner et al. | 355/14 |
| 4,540,166 | 9/1985 | Massengeil et al. | 271/3.1 |
| 4,629,311 | 12/1986 | Kaneko et al. | 355/14 SH |
| 4,702,589 | 10/1987 | Ito | 355/14 SH |
| 4,743,945 | 5/1988 | Ito et al. | 355/14 SH |

FOREIGN PATENT DOCUMENTS

| | | |
|---|---|---|
| 53-98833 | 8/1978 | Japan . |
| 62-116464 | 5/1987 | Japan . |

*Primary Examiner*—Donald A. Griffin

*Attorney, Agent, or Firm*—Wenderoth, Lind & Ponack

[57] ABSTRACT

A transport apparatus for successively transporting a plurality of sheet media having different lengths from a first processing station to a second processing station. The apparatus comprises, as main components thereof, a tray disposed between the first and second processing stations for accommodating the media as stacked one upon another, a first transport device for receiving the media from the first processing station and transporting the media to the tray, a second transport device for acting on leading ends of the media stored on the tray and successively picking up the media to transport the media to the second processing station, and a roller disposed above the tray for contacting a top surface of the media stored on the tray. The roller is rotatable to align the leading ends of the media.

18 Claims, 2 Drawing Sheets

SHEET TRANSPORT APPARATUS

BACKGROUND OF THE INVENTION (1) Field of the Invention

The present invention relates to a transport apparatus for feeding media in sheets of various sizes from a first processing station to a second processing station.

(2) Description of the Prior Art

One example of the above transport apparatus is an image-forming apparatus in which the first processing station is an exposure station and the second processing station a developing station. In the image-forming apparatus, a photosensitive recording film is exposed to light at the exposure station for forming an image thereon, and the image-carrying film is transported to the developing station for developing the image into a visible image.

Known image-forming apparatus generally include only a plurality of transport rollers between the exposure station and developing station. Accordingly, there is no problem unless the processing speed (film transport speed) V1 at the exposure station is higher than the processing speed (film transport speed) V2 at the developing station. If the processing speed V1 is maintained higher than the processing speed V2, the recording film will accumulate upon a transport path between the exposure station and developing station in an amount corresponding to a difference $(V1-V2)$ per unit time between the two processing speeds. In such a case, therefore, the processing at the exposure station must be adjusted to the transport speed at the developing station such as by controlling the exposure station to wait for completion of the processing at the developing station and transporting a next sheet of film from the exposure station to the developing station only after the processing is completed at the developing station.

It is conceivable as a solution to the above problem to provide a film-storing tray between the exposure station and developing station so that the processing at the exposure station need not be adjusted to the transport speed at the developing station. However, where the film is in sheets of various sizes, the sheets of film S1 are stacked on the tray T with leading ends thereof placed out of register as shown in FIG. 1. This state makes it difficult for the sheets of film S1 to be picked up and sent out of the tray T reliably.

SUMMARY OF THE INVENTION

A primary object of the present invention, therefore is to provide a sheet transport apparatus comprising a first processing station (exposure station) and a second processing (developing station) capable of processing sheets at processing speeds of their own even when the processing speed of the first processing station is higher than that of the second processing station.

Another object of the present invention is to provide a sheet transport apparatus capable of feeding sheets smoothly to the second processing station.

These objects are fulfilled, according to the present invention, by a transport apparatus for transporting a plurality of sheet media having different lengths from a first processing station to a second processing station, comprising a tray disposed between the first processing station and the second processing station for accommodating the media as stacked one upon another; first transport means for receiving the media from the first processing station and transporting the media to the tray, second transport means for acting on leading ends of the media stored on the tray and successively picking up the media to transport the media to the second processing station, and a roller disposed above the tray for contacting a top surface of the media stored on the tray, the roller being rotatable to align the leading ends of the media.

In a different aspect of the present invention, where a maximum media length 10 and a minimum media length 11 are in a relationship $11 < \frac{1}{2}10$, a single roller is disposed above and substantially centrally of the tray for aligning the leading ends of the media.

According to a further aspect of the invention, where a maximum media length 10 and a minimum media length 11 are in a relationship $11 < \frac{1}{2}10$, and a plurality of rollers are provided above the tray for aligning the leading ends of the media.

In sum, the objects of the invention are fulfilled by providing a tray between the first and second processing stations for accommodating the media as stacked thereon, and at least one roller disposed above the tray for contacting a top surface of the media and aligning leading ends of the media on the tray.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings

DESCRIPTION OF THE PREFERRED EMBODIMENT

Figure 1:
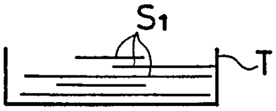
Fig. 1 Prior Art
FIG. 1 is a view illustrating how sheets of various sizes are stored on a sheet tray according to the prior art.
Figure 2:
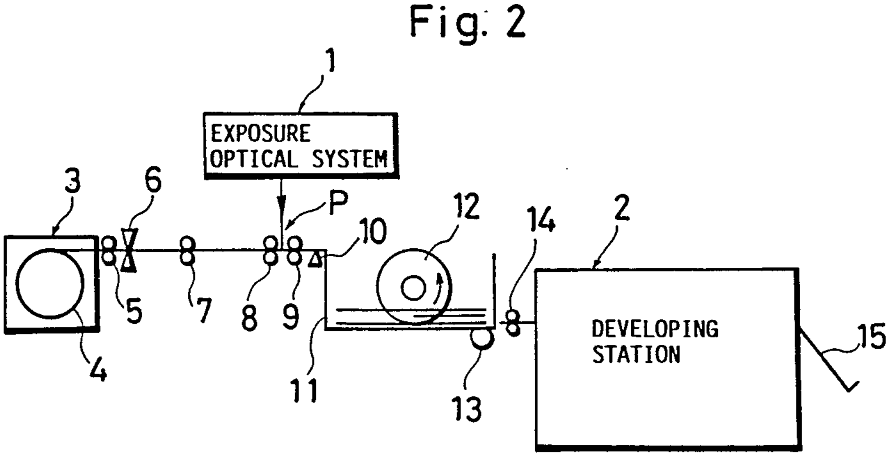
FIG. 2 is a schematic view illustrating an image-forming apparatus embodying the present invention.

Referring to FIG. 2, an image-forming apparatus embodying the present invention comprises an exposure optical system 1, a second processing station or developing station 2, and a magazine 3 housing a rolled recording film 4 and removably mounted in the illustrated position. The rolled recording film 4 in the magazine 3 is a photosensitive film such as a silver salt film, which is pulled out of the magazine 3 by a feed roller pair 5. A transport path extending from the feed roller pair 5 to an exposure station P of the exposure optical system 1 includes a cutter 6 for cutting the recording film to selected sizes, and a transport roller pair 7. The exposure station P includes transport roller pairs 8 and 9 for nipping and transporting at a fixed speed the recording film delivered by the transport roller pair 7. The exposure optical system 1 directs a laser beam to the recording film lying between the two transport roller pairs 8 and 9, thereby to form an image on the recording film.

The exposure optical system 1 modulates the laser beam in response to an image signal, and line-scans the recording film by causing the modulated laser beam to sweep the film in a direction perpendicular to a film transport direction. This optical system 1 has a construction well-known in the art and its description is omitted here.

A transport path extending from the exposure station P to the developing station 2 includes, in addition to the transport roller pair 9, a sensor 10 for detecting leading ends of recording sheets, a tray 11 for storing the sheets as stacked thereon, and a transport roller pair 14.

The tray 11 has an aligning roller 12 for aligning the leading ends of the sheets, and a pickup roller 13 for sending the sheets out of the tray 11.

The tray 11 has a bottom area slightly larger than a maximum sheet size for accommodating sheets of any size, and a sufficient depth for accommodating a multiplicity of sheets as stacked. Further, the tray 11 includes lateral guides adjusted to the width of the recording film 4 in advance. The tray 11 defines an opening, not shown, in the bottom at a forward end with respect to the film transport direction. This opening has an appropriate size for allowing the pickup roller 13 to act on a lowermost sheet in the tray 11.

Figure 3:
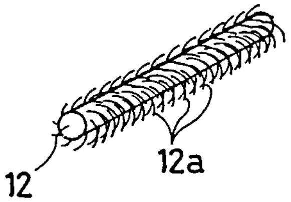
FIG. 3 is a perspective view of an aligning roller having fins.
Figure 4:
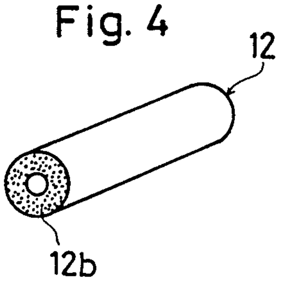
FIG. 4 is a perspective view of an aligning roller having a sponge.

The aligning roller 12 includes elastic fins 12*a* as shown in FIG. 3 or a soft sponge 12*b* as shown in FIG. 4. These fins or sponge have a suitable coefficient of friction for applying a carrying force to the sheets with rotation of the aligning roller 12, thereby to align the leading ends of the sheets. The aligning roller 12 is rotatable by a motor, not shown, for a predetermined time (that is the time required for the leading ends of the sheets to reach the forward end of the tray) when the sensor 10 detects the leading ends of the sheets. The aligning roller 12 is rotatable at a higher speed than the transport roller pairs 7, 8 and 9. If the transport roller pairs 7, 8 and 9 rotated faster, a sheet would be delivered to the tray 11 to overlie a preceding sheet before the preceding sheet is placed in alignment, thereby impairing the alignment.

Figure 5:
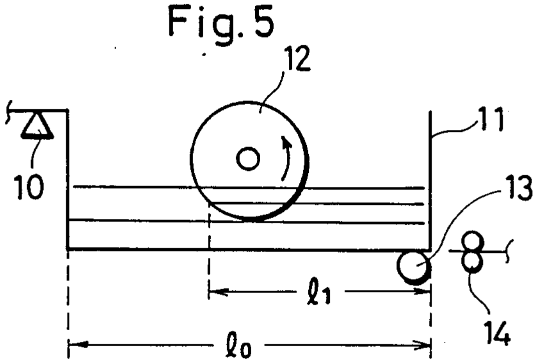
FIG. 5 is a view illustrating a roller position where a minimum sheet length 11 is equal to or greater than half of a maximum sheet length 10.
Figure 6:
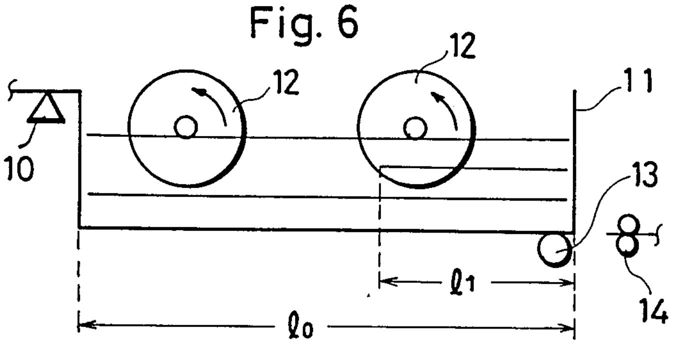
FIG. 6 is a view illustrating roller positions where the minimum sheet length 11 is smaller than half of the maximum sheet length 10.
Figure 7:
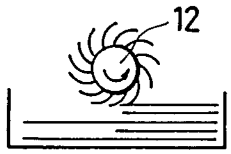
FIG. 7 is a schematic view illustrating the relationship between the aligning roller and a tray.

The position of the aligning roller 12 is determined as follows. Where, as shown in FIG. 5 for example, a minimum sheet length l1 is equal to or greater than half of a maximum sheet length l0, the aligning roller 12 may be set to a halfway position ½l0 from the forward end of the tray 11. On the other hand, where, as shown in FIG. 6, the minimum sheet length l1 is smaller than half of the maximum sheet length l0, it is necessary to provide two or more aligning rollers since a single roller is not adequate for the purpose.

Two or more aligning rollers may of course be provided where the minimum sheet length is equal to or greater than half of the maximum sheet length.

The aligning roller or rollers 12 may be fixed in position, or may be vertically movable. In the latter case, the roller or rollers 12 is/are normally retracted upwardly, and is/are lowered and rotated to perform the sheet aligning function when the sheets are delivered to the tray.

The pickup roller 13 includes an elastic material having a relatively high coefficient of friction wound as on the aligning roller shown in FIG. 4. The pickup roller 13 is driven by a motor, not shown, to send the lowermost sheet out of the tray 11. The pickup roller 13 is rotatable for a predetermined time when a sheet end detecting sensor, not shown, at a sheet inlet of the developing station 2 detects the rear end of a sheet. This arrangement causes the pickup roller 13 to send out the sheets in timed relationship with the processing speed through the developing station 2. Number 15 in FIG. 2 indicates a sheet discharge tray.

The developing station 2 receives the sheets from the roller pair 14 and advances the sheets therethrough. During the passage through the developing station 2, the sheets of recording film are subjected to various processes such as a developing process and a fixing process, whereby the images on the sheets become visible images. Details of the developing station 2 are well-known and are, therefore, not described herein.

How the image-forming apparatus according to this embodiment operates will be described next.

First, when the magazine 3 is mounted in position, the roller pair 5 engages a forward end of the rolled recording film to be ready for a printing sequence. When a print button, not shown, is pressed thereafter, the roller pair 5 rotates to pull out a selected length of the recording film (a length corresponding to A4 or A3 size, for example). Then the cutter 6 cuts that length off the rest of the recording film. The resulting sheet is transported by the roller pairs 7 and 8 to the exposure station P. When the sheet is nipped by the roller pair 9 at the exposure station P, the sheet is exposed to a beam modulated by the optical system 1 in response to an image signal provided by a host computer, not shown, whereby an image is formed on the sheet of recording film. After the exposure, the sheet is transported by the roller pair 9 to the tray 11 through the sensor 10. When the sensor 10 detects the leading end of the sheet, the aligning roller 12 is driven by the motor to rotate for the predetermined time required for aligning the leading end of the sheet. In this way, a plurality of sheets are stored in the tray 11 with the leading ends thereof aligned regardless of sheet sizes.

A sheet transport speed from the magazine 3 to the tray 11, namely a processing speed through the image-forming section of the apparatus, is faster than a sheet transport speed through the developing station 2, namely the processing speed of the developing station 2. Therefore, the sheets of recording film accumulate one upon another in the tray 11. Thereafter, the sheets are sent out of the tray 11 by the pickup roller 13 in the order in which the sheets were delivered to the tray 11. The sheets proceed through the transport roller pair 1 4 into the developing station 2, and are discharged onto the tray 15 after the developing and other processes.

While the magazine contains a rolled recording film 4 in the described embodiment, the magazine may of course contain a recording film in sheet form instead.

The invention is not limited to the described embodiment, but may be applied to other types of sheet transporting and processing apparatus such as a machine for labeling sheets and a machine for forming cutouts in sheets.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transport apparatus for successively transporting a plurality of sheet media having different lengths from a first processing station to a second processing station, comprising:

a tray disposed between said first processing station and said second processing station for accommodating said media as stacked one upon another;

first transport means for receiving said media from said first processing station and transporting said media to said tray, second transport means for acting on leading ends of said media stored on said tray and successively picking up said media to transport said media to said second processing station, and a roller disposed above said tray for contacting a top surface of said media stored on said tray, said roller being rotatable to align the leading ends of said media.

2. A transport apparatus as claimed in claim 1, wherein said roller defines fins having appropriate elasticity and friction on an outer periphery thereof.

3. A transport apparatus as claimed in claim 1, wherein said roller defines a sponge layer having appropriate elasticity and friction on an outer periphery thereof.

4. A transport apparatus as claimed in claim 1, wherein said first processing station is an image-forming station, and said second processing station is a developing station.

5. A transport apparatus as claimed in claim 1, wherein said first transport means extends to a position above said tray, and said second transport means extends from a position below said tray.

6. A transport apparatus as claimed in claim 1, wherein said tray has a bottom area slightly larger than a maximum media size.

7. A transport apparatus for successively transporting a plurality of sheet media having different lengths from a first processing station to a second processing station, comprising:

a tray disposed between said first processing station and said second processing station for accommodating said media as stacked one upon another;

first transport means for receiving said media from said first processing station and transporting said media to said tray, second transport means for acting on leading ends of said media stored on said tray and successively picking up said media to transport said media to said second processing station, and roller means for contacting a top surface of said media stored on said tray to align the leading ends of said media, wherein a maximum media length 10 and a minimum media length 11 are in a relationship $11 < \frac{1}{2}10$, and said roller means includes a single roller disposed above and substantially centrally of said tray, said roller being rotatable to align the leading ends of said media.

8. A transport apparatus as claimed in claim 7, wherein said roller defines fins having appropriate elasticity and friction on an outer periphery thereof.

9. A transport apparatus as claimed in claim 7, wherein said roller defines a sponge layer having appropriate elasticity and friction on an outer periphery thereof.

10. A transport apparatus as claimed in claim 7, wherein said first processing station is an image-forming station, and said second processing station is a developing station.

11. A transport apparatus as claimed in claim 7, wherein said first transport means extends to a position above said tray, and said second transport means extends from a position below said tray.

12. A transport apparatus as claimed in claim 7, wherein said tray has a bottom area slightly larger than a maximum media size.

13. A transport apparatus for successively transporting a plurality of sheet media having different lengths from a first processing station to a second processing station, comprising:

a tray disposed between said first processing station and said second processing station for accommodating said media as stacked one upon another;

first transport means for receiving said media from said first processing station and transporting said media to said tray, second transport means for acting on leading ends of said media stored on said tray and successively picking up said media to transport said media to said second processing station, and roller means for contacting a top surface of said media stored on said tray, said roller means being rotatable to align the leading ends of said media, wherein a maximum media length 10 and a minimum media length 11 are in a relationship $11 < \frac{1}{2}10$, and said roller means includes a plurality of rollers rotatable to align the leading ends of said media

14. A transport apparatus as claimed in claim 13, wherein each of said rollers defines fins having appropriate elasticity and friction on an outer periphery thereof.

15. A transport apparatus as claimed in claim 13, wherein each of said rollers defines a sponge layer having appropriate elasticity and friction on an outer periphery thereof.

16. A transport apparatus as claimed in claim 13, wherein said first processing station is an image-forming station, and said second processing station is a developing station.

17. A transport apparatus as claimed in claim 13, wherein said first transport means extends to a position above said tray, and said second transport means extends from a position below said tray.

18. A transport apparatus as claimed in claim 13, wherein said tray has a bottom area slightly larger than a maximum media size.

* * * * *